US012763573B2

(12) United States Patent
Johnny et al.

(10) Patent No.: US 12,763,573 B2
(45) Date of Patent: Oct. 13, 2026

(54) JOINT FAULT DETECTION AND COMMUNICATION FOR DC POWER LINES

(71) Applicant: Cence Power Inc., Toronto (CA)

(72) Inventors: Milad Johnny, Thornhill (CA); Bolis Ibrahim, Toronto (CA); Sagar Jaiswal, Milton (CA); Willy Liu, Mississauga (CA)

(73) Assignee: Cence Power Inc., Markham (CA)

( * ) Notice: Subject to any disclaimer, the term of this patent is extended or adjusted under 35 U.S.C. 154(b) by 154 days.

(21) Appl. No.: 18/764,522

(22) Filed: Jul. 5, 2024

(65) Prior Publication Data

US 2026/0012004 A1 Jan. 8, 2026

(51) Int. Cl.

| | |
|---|---|
| ***H02H 7/26*** | (2006.01) |
| ***H04B 3/46*** | (2015.01) |
| ***H04L 5/00*** | (2006.01) |

(52) U.S. Cl.

CPC ............... *H02H 7/268* (2013.01); *H04B 3/46* (2013.01); *H04L 5/0007* (2013.01)

(58) Field of Classification Search

CPC ......... H02H 7/268; H04B 3/46; H04L 5/0007

See application file for complete search history.

(56) References Cited

U.S. PATENT DOCUMENTS

| | | | | |
|---|---|---|---|---|
| 3,668,659 | A | 6/1972 | Hutchings | |
| 8,781,637 | B2 | 7/2014 | Eaves | |
| 9,184,795 | B2 | 11/2015 | Eaves | |
| 10,104,610 | B2 | 10/2018 | Heidler et al. | |
| 10,714,930 | B1 | 7/2020 | Weiss et al. | |
| 10,732,688 | B2 | 8/2020 | Goergen et al. | |
| 10,928,794 | B2 * | 2/2021 | Bennett | H02H 7/268 |
| 11,063,630 | B2 | 7/2021 | Arduini et al. | |
| 11,573,256 | B2 * | 2/2023 | Handy | H01F 27/289 |
| 11,671,926 | B2 * | 6/2023 | Bennett | H04B 3/46 455/127.1 |
| 11,733,285 | B2 | 8/2023 | Siddique et al. | |
| 2009/0017757 | A1 | 1/2009 | Koga et al. | |
| 2016/0323017 | A1 | 11/2016 | Stratford et al. | |
| 2022/0050135 | A1 | 2/2022 | Nordin et al. | |

FOREIGN PATENT DOCUMENTS

| | | |
|---|---|---|
| CN | 101799681 | 11/2010 |
| WO | 201709225 | 1/2017 |

OTHER PUBLICATIONS

International Search Report dated Oct. 6, 2025 corresponding to PCT/CA2025/050920.

* cited by examiner

*Primary Examiner* — Reena Aurora
(74) *Attorney, Agent, or Firm* — Rowand LLP

(57) ABSTRACT

A fault detection system for detecting a fault condition in a direct current (DC) system. The system may include a DC power transmitter to energize a cable and a DC power receiver connected to the cable. A signal generator at the receiver employs orthogonal frequency division multiplexing (OFDM) and combines symbols for messaging or data communications with redundant symbols dedicated to fault detection. At a signal receiver, the transmitted OFDM signal is used to measure changes in the channel transfer function by monitoring changes in a parameter of the received redundant symbols. The redundant symbols need not be decoded to detect a greater-than-threshold change in the transfer function that is indicative of a fault on the cable.

18 Claims, 6 Drawing Sheets

JOINT FAULT DETECTION AND COMMUNICATION FOR DC POWER LINES

FIELD

The present application generally relates to direct current (DC) power lines and, in particular, to methods and systems for fault detection on high voltage DC power lines.

BACKGROUND

High voltage power lines can be dangerous. DC can be a desirable option for power transmission in some cases so as to minimize alternating current (AC) line losses and to minimize AC-DC conversions in the case of DC loads. However, DC can be dangerous in that it does not have zero-crossings that can serve to self-extinguish an arc. In order to safely transmit high voltage DC power, a very high-speed fault detection mechanism is needed. For example, in a 450V rated system a clearing time for low resistance ground faults is about 5.4 milliseconds.

DC power transmission can be implemented as a two-wire system or a three-wire system. Faults can be human contact (one wire touch, or two wire touch), short circuit, open circuit, over voltage, or over current. Human contact can be dangerous and sometimes even fatal. Fast fault detection and power disconnection are important safety features.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1A:
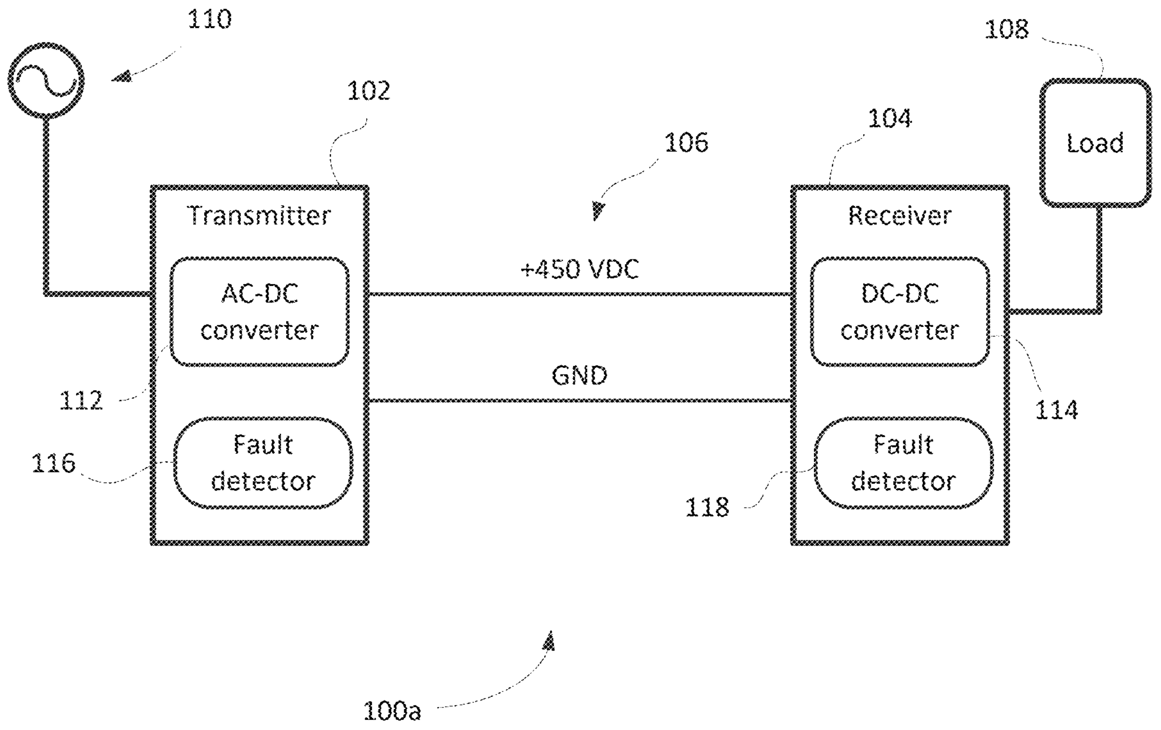
FIG. 1A diagrammatically illustrates an example of a basic DC power two-wire transmission system.

In a first aspect, the present application describes a fault detection system for detecting a fault condition. The system may include a power transmitter to energize a transmission line with high voltage DC power; and a power receiver to couple the transmission line to a load. The power receiver may include a signal generator coupled to the transmission line to generate and propagate a high frequency signal on the transmission line using multiple subbands and orthogonal frequency division multiplexing to encode a bitstream that includes a set of message symbols and a set of redundant symbols, and wherein the set of redundant symbols are transmitted on one or more of the multiple subbands. The power transmitter may include a signal receiver coupled to the transmission line to receive the high frequency signal, to extract a set of propagated redundant symbols, and to measure, using the set of propagated redundant symbols, a parameter proportional to a channel frequency response of the transmission line; a fault detection circuit to output a fault signal based on a change in the parameter that exceeds a threshold value; and a switch operable in response to the fault signal to disconnect the transmission line from the high voltage DC power.

In some implementations, the signal generator is configured to mix the set of message symbols with the set of redundant symbols in accordance with a permutation matrix. In some cases, the signal receiver is configured to extract the set of propagated redundant symbols using an inverse permutation matrix that is the inverse of the permutation matrix.

In some implementations, the parameter may be a measured energy of the set of propagated redundant symbols. In some cases, the set of propagated redundant symbols may be the set of redundant symbols modified by the channel frequency response, wherein the energy is determined based on a trace function applied to a matrix-based expression of the set of propagated redundant symbols. In some cases, the fault detection circuit is configured to determine the change in the parameter by determining a magnitude of a difference between the measured energy of the set of propagated redundant symbols and a measured energy of a previously-propagated set of redundant symbols and comparing the magnitude of the difference to the threshold value. In some cases, the fault detection circuit is further configured to adaptively adjust the threshold value based on a history of measured energy tracking changes in the channel frequency response over a time period. The adaptive adjustment of the threshold value may include determining a probability distribution of energy magnitude changes over the time period and setting the threshold value as a function of the probability distribution so as to exclude a substantial portion of the probability distribution attributable to environmental noise.

In some implementations, the set of redundant symbols may be a sequence of predetermined symbols.

In some implementations, the system further includes a termination impedance at the power transmitter, wherein the termination impedance is selected to match a characteristic impedance of the transmission line.

In some implementations, the system further includes a discharge circuit configured to receive the fault signal and to couple the transmission line to ground in response to the fault signal.

In another aspect, the present application describes a fault detection system for detecting a fault condition in a direct current (DC) system. The system may include a power transmitter to energize a transmission line with high voltage DC power; a power receiver to couple the transmission line to a load; at the power receiver, a signal generation means, including, means to generate and propagate a high frequency signal on the transmission line using multiple subbands and orthogonal frequency division multiplexing to encode a bitstream that includes a set of message symbols and a set of redundant symbols, and wherein the set of redundant symbols are transmitted on one or more of the multiple subbands; and at the power transmitter, means to receive the high frequency signal, to extract a set of propagated redundant symbols, and to measure, using the set of propagated redundant symbols, a parameter proportional to a channel frequency response of the transmission line, means to output a fault signal based on a change in the parameter that exceeds a threshold value, and means to, in response to the fault signal, disconnect the transmission line from the high voltage DC power.

In yet a further aspect, the present application describes a method of detecting a fault condition on a transmission line. The method may include energizing a transmission line with high voltage DC power from a power transmitter, wherein the transmission line is coupled to a load at a power receiver; generating and propagating a high frequency signal on the transmission line using multiple subbands and orthogonal frequency division multiplexing to encode a bitstream that includes a set of message symbols and a set of redundant symbols, and wherein the set of redundant symbols are transmitted on one or more of the multiple subbands; receiving, at the power transmitter, the high frequency signal and extracting a set of propagated redundant symbols; measuring, using the set of propagated redundant symbols, a parameter proportional to a channel frequency response of the transmission line; outputting a fault signal based on a change in the parameter that exceeds a threshold value; and disconnecting the transmission line from the high voltage DC power in response to the fault signal.

In some implementations, the generating and propagating includes mixing the set of message symbols with the set of redundant symbols in accordance with a permutation matrix. In some cases, extracting the set of propagated redundant symbols includes using an inverse permutation matrix that is the inverse of the permutation matrix.

In some implementations, measuring the parameter includes determining a measured energy of the set of propagated redundant symbols. In some cases, determining the measured energy includes using a trace function applied to a matrix-based expression of the set of propagated redundant symbols. In some embodiments, outputting the fault signal includes determining the change in the parameter by determining a magnitude of a difference between the measured energy of the set of propagated redundant symbols and a measured energy of a previously-propagated set of redundant symbols and comparing the magnitude of the difference to the threshold value. The method may further include adaptively adjusting the threshold value based on a history of measured energy tracking changes in the channel frequency response over a time period. Adaptively adjusting the threshold value may include determining a probability distribution of energy magnitude changes over the time period and setting the threshold value as a function of the probability distribution so as to exclude a substantial portion of the probability distribution attributable to environmental noise.

Other aspects and features of the present application will be understood by those of ordinary skill in the art from a review of the following description of examples in conjunction with the accompanying figures.

In the present application, the terms “about”, “approximately”, and “substantially” are meant to cover variations that may exist in the upper and lower limits of the ranges of values, such as variations in properties, parameters, and dimensions. In a non-limiting example, the terms “about”, “approximately”, and “substantially” may mean plus or minus 10 percent or less.

In the present application, the term “and/or” is intended to cover all possible combinations and sub-combinations of the listed elements, including any one of the listed elements alone, any sub-combination, or all of the elements, and without necessarily excluding additional elements.

In the present application, the phrase “at least one of . . . or . . . ” is intended to cover any one or more of the listed elements, including any one of the listed elements alone, any sub-combination, or all of the elements, without necessarily excluding any additional elements, and without necessarily requiring all of the elements.

The present application relates to fault detection for power lines and, in particular, fault detection for DC power lines.

In this application, the term “high voltage” is intended to include any voltage that is unsafe to humans or may cause harm to the surrounding environment. This may include, for example, class 4 power lines.

A human touch fault may be modeled as a high resistance ground fault (HRGF) in some cases. A fault detection system ideally quickly detects occurrence of this condition and disconnects power from the transmission line as a result. The time between contact and power shut off should be within the range of 3.78 milliseconds to 5.59 seconds for a corresponding current of 6 mA to 990 mA, based on requirements of the UL 943 standard relating to ground-fault circuit interrupters.

A Human Body impedance model may be used in assessing capacitance-sensing based active injury mitigation systems. The characteristic impedance of a human body varies with frequency. At low frequencies (up to a few kHz), the impedance of the human body is primarily resistive, meaning it behaves like a simple resistor. This resistance is mainly due to the electrical resistance of tissues and fluids in the body. As the frequency increases into the radio frequency (RF) range (from a few kHz to several GHz), the impedance of the human body starts to exhibit capacitive and inductive components in addition to the resistive component. The impedance of the human body also varies depending on factors such as the body’s size, level of hydration/moisture, and the frequency range of interest. In practical terms, this means that the human body can interact differently with electromagnetic fields at different frequencies, influencing factors such as signal transmission through cables or antennas, as well as the absorption of electromagnetic radiation.

In the present application, the term “cable” may be used to refer to a two-wire or three-wire conductor for DC power transmission. The term “cable” is intended to encompass all suitable conductors for DC power transmission and, as will be described below, in some cases may be modeled or treated as a long-wire antenna or may be modeled or treated as a transmission line. The term “transmission line” may be referred to below when describing a connection between a DC power transmitter and a DC power receiver but that term should not necessarily be understood to mean in all cases that the connection is treated as a transmission line model, e.g. balanced positive and negative lines and a traveling sinusoidal signal having a reference to ground. In some cases, the described cable or transmission line may conform to an antenna model having an unbalanced signal.

FIG. 1A diagrammatically illustrates an example of a basic DC power two-wire transmission system 100*a*. The system 100*a* includes a power transmitter 102 at one end of a transmission line 106 and a power receiver 104 at the other end of the transmission line 106. In some examples, the power receiver 104 may be a transceiver, enabling the chaining of successive transmission lines from transceiver to transceiver.

In this example, the receiver 104 is coupled to a DC load 108. The transmitter 102 is connected to an AC power source 110, such as AC mains. The transmitter 102 may include a high power AC-DC converter 112 configured to produce high voltage DC power from the input AC power. In this example, the system 100*a* operates at +450 VDC. In this two-wire example, it will be noted that one wire is at ground and the other wire is at +VDC. The receiver 104 may include a DC-DC converter 114 to convert the +450 VDC to whatever DC voltage level is required by the load 108, and whatever VDC may be used internally at the receiver 104 for electronics and logic.

In this example, the transmitter 102 includes a fault detector 116 and the receiver includes a fault detector 118. The fault detectors 116, 118 are configured to quickly detect a fault on the transmission line 106, and in response to quickly disconnect the transmission line 106 from the AC power source 110 and to de-energize the transmission line 106.

Figure 1B:
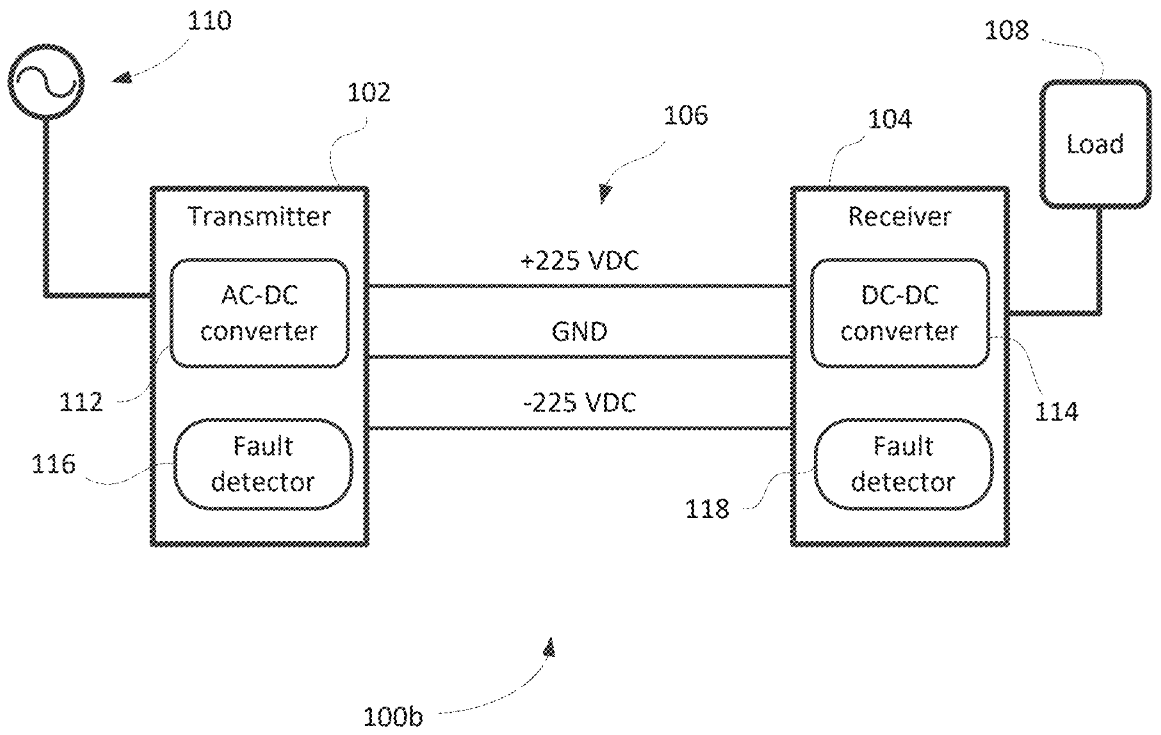
FIG. 1B diagrammatically shows an example of a three-wire DC transmission system.

FIG. 1B shows an example of a three-wire DC transmission system 100*b*. The three-wire DC transmission system 100*b* includes a transmission line 106 that features a ground wire, a +VDC wire and a −VDC wire. In this example, the same DC voltage of +450 VDC is achieved, but through setting the positive wire to +225 VDC and setting the negative wire to −225 VDC.

As noted above, high speed fault detection is advantageous. Various UL standards, including UL 943 and UL1400-1, address the issue of fault-management.

Fault detection in electrical systems may sometimes employ residual current detection (RCD) as the mechanism for identifying a fault condition. It has been found that RCD has insufficient sensitivity to reliably generate a fault detection from human touch. Increasing the number of turns of live wire for detection can improve sensitivity but results in longer clearing time and a shock sensation. Typical ground-fault circuit interrupters are too slow and are better suited to AC fault detection.

At least one attempt has been made to carry out fault detection by sending a low-frequency pulsed signal from the power transmitter to the power receiver and determining, from measured reflections, the reflection coefficient and, thus, the normal impedance of the transmission line. A change in the measured impedance may signal a possible fault. This technique still ends up being too slow for effective quick fault detection and disconnection.

The present application describes a fast fault detection system and method for DC power. The system exploits the skin effect for transmission lines. That is, at higher frequencies the current density of a signal is concentrated near the surface of an electrical conductor. As noted above, at higher frequencies, the human body can be modeled as a more complex impedance, including capacitive and inductive effects. The concentration of high frequency signals near the surface of a conductor make those signals more susceptible to environmental influences, including contact with objects, particularly human or other living bodies. A touch event thus impacts a number of parameters that affect the high frequency signals propagating on a conductor.

An electrical conductor can be modelled as a wired channel having a transfer function that exhibits an impulse response h(t). The frequency response of such a channel may be expressed as:

$$H(f)=\int_{-\infty}^{+\infty}h(t)\,e^{-j2\pi ft}\,dt$$

A fault, such as through a touch event, on the cable is effectively a variation in the normal impulse response and corresponding frequency response of the cable.

In earlier work, as described in U.S. patent application Ser. No. 18/619,966, the contents of which are hereby incorporated by reference, a high frequency signal may be propagated from a receiving end of the cable to the transmitting end. At the transmitting end, changes in the frequency response are detected by measuring the integral of a cross product of the original signal and the received signal. A significant variation may be indicative of a fault condition. In the simplified case of a pure tone sinusoidal signal, the frequency response may be estimated through monitoring of the envelope of the power of the received signal. A significant change in the envelope may be indicative of a fault condition. Various filters may be used to eliminate non-fault conditions or transient false positives.

Advantageously, using a periodic signal generator at the receiving end means that the fault detection system may further be leveraged to engage in a handshaking process prior to energizing the line with high voltage DC power from a power source. This handshaking process may improve safety of the transmission line through enabling using an initial low voltage AC signal from the periodic signal generator to confirm the line is correctly connected and ready for high voltage energy. This may eliminate or reduce the risk of high voltage arcs/faults.

The system may further enable chaining of termination points, wherein the receiver is constructed as a transceiver enabling it to serve as a receiver termination end for a first portion of the transmission line and as a transmitter termination end for a subsequent portion of the transmission line.

The earlier work focused on the use of a high frequency single-tone sinusoid as the periodic signal. The present application combines fault detection with data communication, enabling messaging or signaling together with fault detection. The system described herein employs orthogonal frequency division multiplexing (OFDM) and combines symbols for messaging or communications with symbols dedicated to fault detection. The symbols for fault detection may be referred to as "redundant symbols" in some cases. These symbols are for measuring channel frequency response and detecting changes in the frequency response, at least at one or more specific frequencies in the OFDM scheme.

Figure 2:
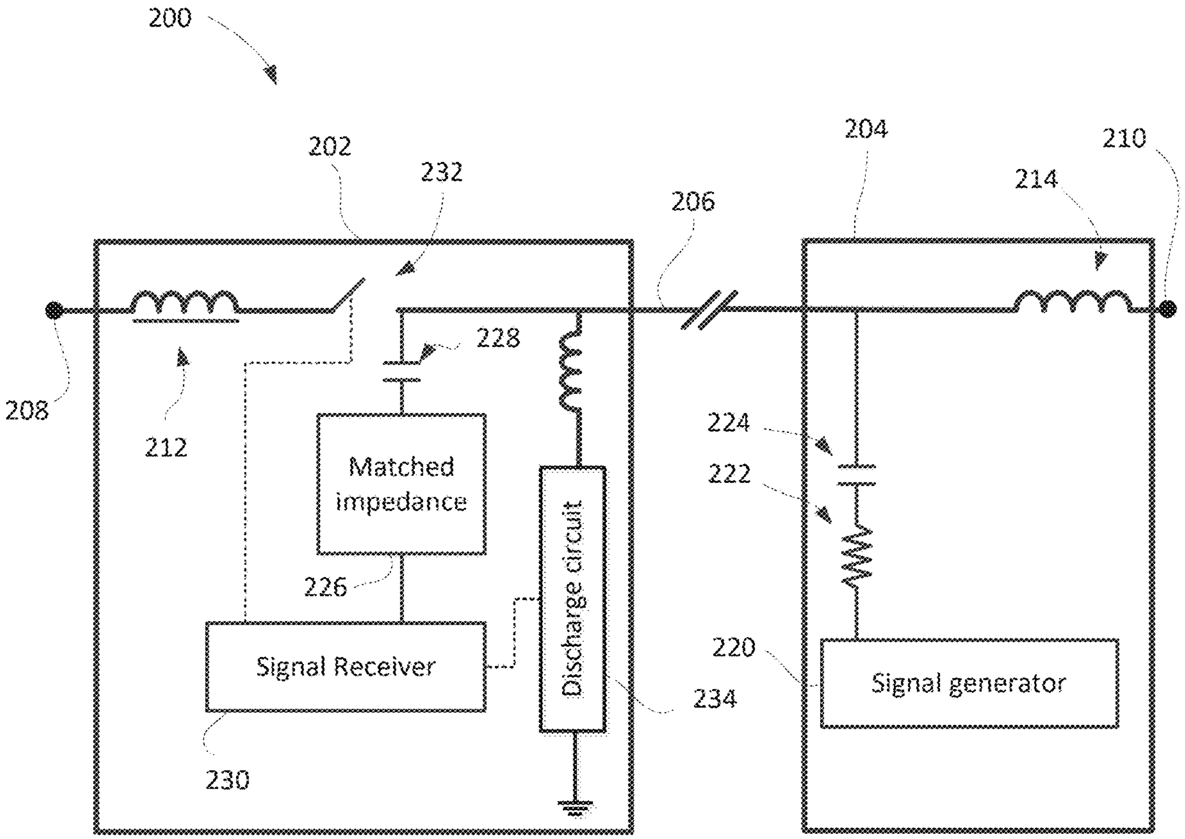
FIG. 2 shows one simplified example fault detection system for DC power transmission.

Reference will now be made to FIG. 2 which shows one simplified example fault detection system 200 for DC power transmission. The system 200 in this example includes a transmitter 202 and a receiver 204 at respective ends of a transmission line 206. The transmission line 206 may be a two-wire cable in some implementations and may be a three-wire cable in some implementations. The system 200 is configured to connect a DC source 208 to a load 210. In some cases, the transmitter 202 may include power conversion components (not shown) to convert DC-to-DC and/or to convert AC-to-DC to realize the DC source 208. For example, the transmitter 202 may be connected to AC mains power and may include one or more power converters to realize the DC source 208 for producing high voltage DC power. The DC source 208 may provide up to 450 VDC in some implementations. Other voltage levels may be used in other implementations.

In this example, the DC source 208 is coupled to the transmission line 206 through a source filter inductor 212 and the transmission line 206 is coupled to the load 210 through a load filter inductor 214. The filter inductors 212, 214 may, in part, isolate the transmission line 206 from either the DC source 208 or the load 210. This may protect components of the DC source 208 and/or the load 210 from AC signals on the transmission line 206, and may isolate the transmission line 206 from interference signals generated within the DC source 208 or the load 210 that may hamper fault detection.

The system 200 is configured to quickly detect a fault condition. The system includes a signal generator 220 configured to generate an OFDM signal at the receiver 204 in this example. The OFDM signal may be generated using message symbols and redundant symbols. As will be described in more detail below, the message symbols may include any communications content and the redundant symbols may be a pseudo-random string or vector of symbols designated for channel frequency response measurement. The message symbols and redundant symbols may be permuted so as to mix them based on a known permutation, and then inverse transformed, upconverted and transmitted as the OFDM signal.

In some cases, the transmitter 202 may include a matched impedance 226 (i.e. a termination impedance) selected to closely match the impedance of the channel (the transmission line 206) so as to reduce or minimize reflected energy. In an ideal case, the matched impedance 226 ensures total absorption of the OFDM signal with no reflection. The matched impedance 226 may be coupled to the transmission line 206 through a blocking capacitor 228 to protect it from the high voltage DC energy on the transmission line 206.

The transmitter 202 includes a signal receiver 230. The signal receiver 230 implements a a fault detection circuit. The signal receiver 230 down-converts and demultiplexes the OFDM signal to obtain a down-converted time-domain signal. It then transforms it to the frequency domain, inverse permutes the transformed signal to obtain the received message symbols and the received redundant symbols. The received redundant symbols are related to the transmitted redundant symbols through the channel frequency response plus some noise. By extracting the received redundant symbols, the system is able to monitor and compare one or more signal parameters in order to detect a likely fault condition based on detecting a more-than-threshold change in the parameter(s). Advantageously, this does not necessarily require decoding of the redundant symbols. The message symbols may be decoded and handled by a communications or messaging module.

The signal receiver 230 is coupled to a switch 232 that couples the DC source 208 to the transmission line 206 such that if the signal receiver 230 detects a greater-than-threshold change in a parameter of the redundant symbols of the OFDM signal, it opens the switch 232 to disconnect the transmission line 206 from the DC power source. The transmitter 202 may further include a discharge circuit 234 configured to quickly discharge the transmission line 206 in the event of a fault condition and disconnection from the DC power source. The discharge circuit 234 may include a power MOSFET or other such switch configured in a normally-open-circuit state. The discharge circuit 234 may operate under control of a fault signal from the signal receiver 230 to close and connect the transmission line 206 to ground.

In some implementations (not shown in FIG. 2), the transmitter 202 may include a separate signal generator to propagate an OFDM signal towards the receiver 204. The receiver 204 in such an embodiment may then include a receiver-side signal receiver and may be configured to operate in a manner similar to the signal receiver 230 by detecting a change in the channel frequency response based on the received OFDM signal at the receiver 204.

Advantageously, the above-described system can be implemented in a way that achieves high-speed detection of a fault condition, and high-speed disconnection and discharge of the transmission line. While other fault detection apparatuses may take as little as 1-3 milliseconds at best to detect a fault condition, the present application describes apparatuses that can detect a fault condition within microseconds and, in some implementations, within nanoseconds.

The impedance of a cable is proportional to its inductance and capacitance. Two long parallel transmission lines are an alternative to a coaxial cable and have many applications below 100 MHz with lower loss than coaxial cables. However, they tend to be more susceptible to interference from nearby objects and the environment. The capacitance of two parallel wires of radius a and separated by a distance D can be modelled as:

$$C = \frac{\pi\epsilon}{\ln\left[\frac{D}{a} + \sqrt{\left(\frac{D}{a}\right)^2 - 1}\right]},$$

In the above expression, $\epsilon=\epsilon_r\epsilon_0$, where $\epsilon_r$ is the permittivity constant of the dielectric between the two parallel wires, and $$\epsilon_0 = 8.85\times10^{-12}\frac{F}{m}$$

is the permittivity of free space (farads per meter).

The inductance of this structure can be calculated as follows:

$$L = \frac{\mu_0}{\pi}\ln\left[\left(\frac{D}{a}\right) + \sqrt{\left(\frac{D}{a}\right)^2 - 1}\right]$$

In this expression, $\mu_0=4\pi\times10^{-7}$ N/A$^2$ (newtons per ampere squared).

Then the input impedance of the cable can be approximated as follows:

$$Z_0 = \sqrt{\frac{L}{C}} = \frac{1}{\pi}\sqrt{\frac{\mu_0}{\epsilon}}\ln\left(\frac{2D}{a}\right)$$

Therefore, for greater cable thickness (or gauge) the impedance of the cable is lower. The equivalent resistance of the cable per meter can be calculated as follows:

$$R_0 = \frac{1}{\pi a\delta\sigma_c}$$

In the above relation, $\delta$ is the skin depth of the cable and $\sigma_c$ is the conductivity coefficient of the material of the wires.

In this case the conductance of the wire can be calculated as follows:

$$G_0 = \frac{\pi\sigma_d}{\cosh^{-1}\frac{D}{2a}}$$

In this expression, $\sigma_d$ is the conductivity of the dielectric between the two parallel wires.

For a high enough frequency signal, the value of $$\frac{R}{2\pi fL} << 1 \text{ and } \frac{G}{2\pi fC} << 1.$$

Then the voltage across the cable (signal amplitude) as a function of distance from the voltage source be calculated as follows:

$$V_{out}(x, t) \approx V_{in}\left(t - \frac{2\pi}{\lambda}x\right)e^{-\frac{1}{2}\sqrt{LC}\left(\frac{R}{L}+\frac{G}{c}\right)x}.$$

If we consider $\sigma_d \rightarrow \infty$, then the above relation can be simplified as follows:

$$V_{out}(x, t) \approx V_{in}\left(t - \frac{2\pi}{\lambda}x\right)e^{-\frac{1}{2}\sqrt{LC}\left(\frac{R}{L}+\frac{G}{C}\right)x},$$

where in the above relation x is the distance from the source point location and λ is the wavelength of the signal (that is superimposed or coupled onto the transmission line).

If we have a transmission line with the length of l, then the input impedance of the cable can be calculated as follows:

$$Z_{in}(l) = Z_0\frac{Z_L + jZ_0\tan\beta l}{Z_0 + jZ_L\tan\beta l}, \beta = \frac{2\pi}{\lambda}$$

In the above relation, λ represents the wavelength of the signal, $Z_0$ is the characteristic impedance of the cable, and β is the angular wavenumber of the signal.

For the case where the load impedance is equal to the characteristic impedance of the cable ($Z_0$), the input impedance of the cable is also $Z_0$. In some of the examples below, it may be assumed that there are matched loads at all destination points (i.e. at the load). The reason for seeking a matched load is that, with an unmatched load, all the parameters of the transmitted signal depend on the cable length, which is unreliable. For the case where $Z_L=Z_0$, the input impedance of the cable for any length remains $Z_0$, indicating that it is not a function of the cable length. Advantageously, this means that any length of cable may be used without having to manually try to match impedance in the field.

If a fault occurs at a particular point on the line, there is a length $L_1$ to the left and a length $L_2$ to the right, and the fault introduces an impedance $Z_f$ across the two lines. The impedance of the cable from the right-hand side of the fault impedance that is injected onto the cable can be calculated as follows:

$$Z_{RH} = Z_0\frac{Z_L + jZ_0\tan\beta L_2}{Z_0 + jZ_L\tan\beta L_2}, \beta = \frac{2\pi}{\lambda}, \lambda = 3\times 10^8/f$$

Then the impedance of the cable with reference to the sources is given by:

$$Z_{input} = Z_0\frac{(Z_{RH}\|Z_f) + jZ_0\tan\beta L_1}{Z_0 + j(Z_{RH}\|Z_f)\tan\beta L_1}$$

The above expression shows the variation in the value of the impedance from the source's viewpoint.

As noted above, in some cases, the transmission line can be modeled as a channel having a frequency response given as:

$$H(f) = \int_{-\infty}^{+\infty} h(t)e^{-j2\pi ft}dt$$

In cables used for power transmission, the above mathematical model of the channel represents the frequency representation model of the cable, which behaves like a low pass filter, where the frequency response depends on the characteristics of the cable, environmental conditions and many other factors. For an input signal, x(t), superimposed (or injected, or coupled) onto the cable, the received signal can be modeled by:

$$y(t) = x(t) * h(t),$$

In the above relation, "*" represents the convolution operation that can be modeled as follows:

$$y(t) = \int_{-\infty}^{+\infty} x(\tau)h(t-\tau)d\tau$$

In the frequency domain, wherein the input signal is X(f) this modeling can be expressed as:

$$Y(f) = H(f)X(f)$$

Electrical faults on the cable can create variation in the normal impulse response and corresponding frequency response of the cable with regard to time. Accordingly, in this sense the channel can be modeled as a liner time variant system where its characteristics change in the presence of a fault. The frequency representation model of the received signal as a time variant system is thus:

$$Y(f, t') = H(f, t')X(f)$$

$$h(t, t') = \sum_{i=0}^{\infty}\alpha_i(t')\delta(t - t_0 - i\tau_s)$$

The above expression reflects the time-variant impulse response h(t, t') of the cable. In the above expression, $$t_0 = \frac{l}{c_0\sqrt{\epsilon_r\mu_r}},$$

l is the length of the cable, $c_0=3\times10^8$ represents the speed of light in vacuum, $\epsilon_r$ is dielectric permittivity, $\mu_r$ is a magnetic permeability constant of the medium, $\alpha_i(t')$ is a parameter that is dependent on the environmental conditions and any fault on the cable, and $\tau_s$ represents a time resolution constant used for representing channel impulse response in the time domain. The value of $\tau_s$ depends in part on the bandwidth (BW) of the channel under analysis that, based on the Nyquist sampling rate theorem, may be calculated as $$\frac{1}{2BW}.$$

In order to detect a fault on the cable, the system may monitor for changes in the frequency response of the channel. This measurement can be done on a narrow frequency bandwidth, or a wide enough frequency bandwidth to cover the most dramatic changes in the frequency response of the cable during the presence of a fault.

As noted above, in one aspect the present application describes a system in which a DC power receiver includes a signal generator to generate an OFDM signal to be injected into the cable and transmitted to the DC power transmitter. The OFDM signal includes symbols for communication mixed with symbols for measuring channel frequency response, which are referred to herein as redundant symbols. By extracting the redundant symbols from the received OFDM signal after propagation through the transmission line, the transmitter can identify changes in the frequency response without needing to decode the symbols.

Figure 3:
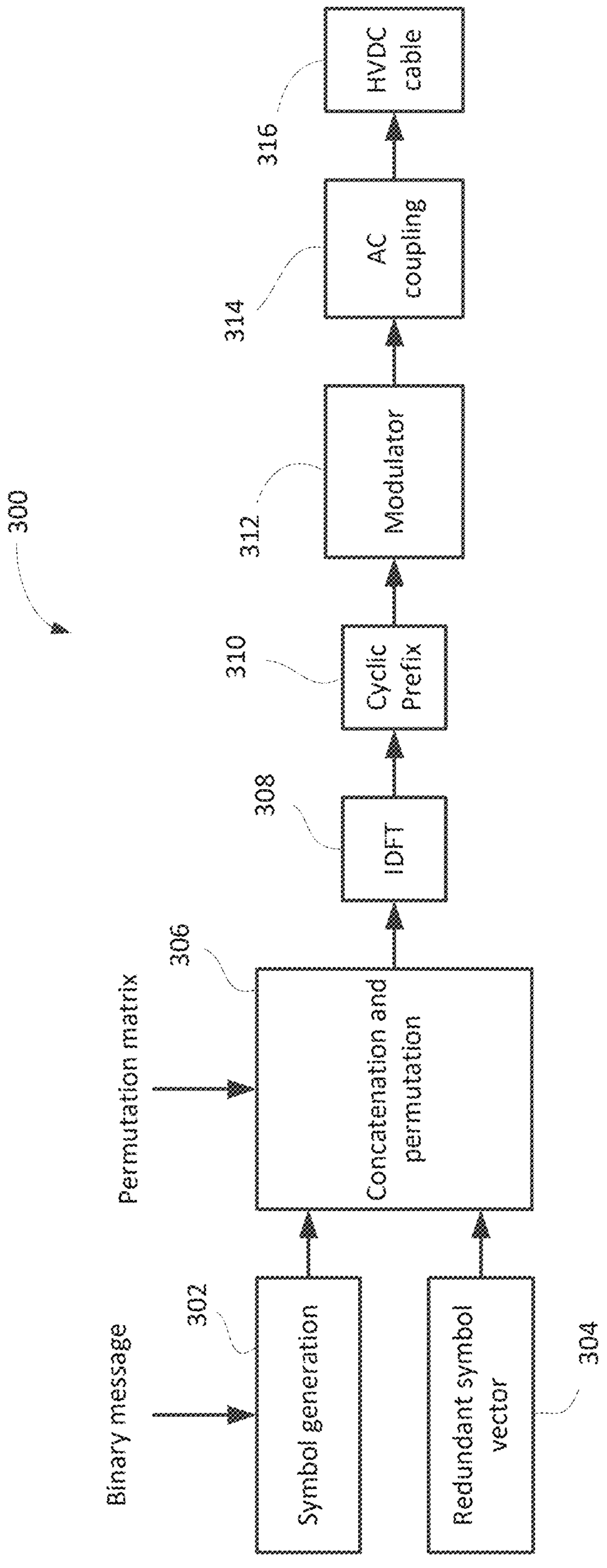
FIG. 3 shows a simplified block diagram of an example of a DC power receiver and, in particular, components of a signal generator within the DC power receiver.

Reference will now be made to FIG. 3, which shows a block diagram of an example implementation of the DC power receiver 300 and, in particular, its signal generation components. As will be understood by those skilled in the art, a stream of binary message data may be partitioned into subblocks of b bits and each block may be mapped to a specific symbol in the signal constellation. Each symbol may be denoted $S_i$, where $i \in \{0, 1, \ldots, 2^b-1\}$. Each symbol $S_i$ represents a number between $-A2^{b-1}$ and $A2^{b-1}$. In this expression, A represents the distance between the closest symbols in the constellation. The final complex-valued message symbol can then be generated based on the following relation:

$$d_i = S_i + jS_i',\ j = \sqrt{-1}.$$

The sequence of message symbols may be broken into blocks of M symbols. Each block of message symbols may be represented by a complex vector $\overline{D}=[d_1, d_2, \ldots d_M]^T$, as indicated by reference numeral 302. The sequence of message symbols may be generated to represent a binary message, which may be used to communicate sensor data, operating parameters, or any other communications content to be sent from the DC receiver to the DC transmitter.

In addition to the generation of the complex vector $\overline{D}$, the receiver 300 may include a redundant symbol generator 304 to generate a redundant symbol vector $\overline{V}$. The redundant symbol vector $\overline{V}$ is a pseudo-random vector $\overline{V}=[v_1, v_2, \ldots v_L]^T$ of L symbols, where M>>L. The function of the redundant symbol vector $\overline{V}$ is for measuring frequency response of the cable at some specific frequencies, as will be described below.

In this example, the set of message symbols in the complex vector (transposed) $\overline{D}^T$ are then concatenated with the redundant symbol vector (transposed) $\overline{V}^T$, and the resulting vector $[\overline{D}^T|\overline{V}^T]^T$ is permuted by a predetermined permutation matrix $\overline{P}$, as indicated by reference numeral 306. The permutation matrix $\overline{P}$ may be a full rank matrix with the rank of M+L and a size of (M+L)×(M+L). The permutation matrix $\overline{P}$ may be defined as:

$$\overline{P} = [p_{ij}],\ i, j \in \{1, \ldots, M+L\}$$

In each row and column of $\overline{P}$, there is only one non-zero element with the value of 1. The resulting output vector is thus given by:

$$\overline{X} = \overline{P}\left[\overline{D}^T \,\middle|\, \overline{V}^T\right]^T$$

This resulting output vector $\overline{X}$ may then be converted to the time domain using an inverse discrete Fourier transform (IDFT), or another inverse spectral transform (e.g. IFFT), as indicated by reference numeral 308, which results in a time-domain bitstream. A cyclic prefix 310 may be added to the time-domain bitstream for synchronization purposes. The time-domain bitstream is then input to a modulator 312 to generate an OFDM signal. The modulator 312 may include elements for converting the input signal to real and imaginary components, converting the digital stream to analog, upconverting the analog signals using a carrier signal $A\cos(2\pi f_c t)$ and its phase-shifted version. In some implementations, the modulator 312 includes two mixers to mix the carrier signal and its phase shifted version, e.g. $A\sin(2\pi f_c t)$, with the real and imaginary parts of the IDFT 208 and cyclic prefix 312 blocks. The output OFDM signal is then injected into the HVDC cable 316 via an AC coupling 314.

Figure 4:
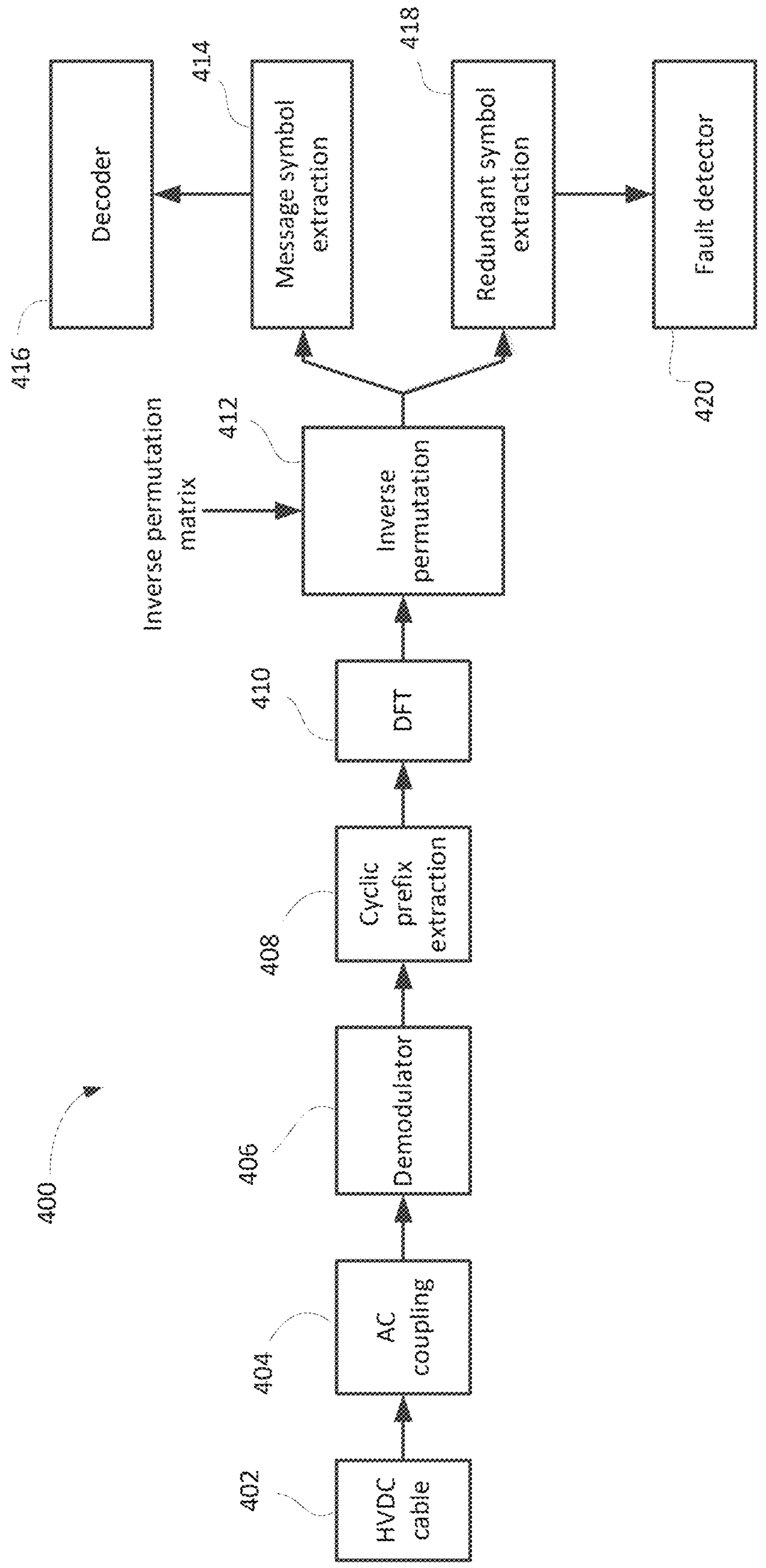
FIG. 4 shows a simplified block diagram of an example of a DC power transmitter and, in particular, components of a signal receiver within the DC power transmitter.

The signal transmitted through the cable is received by the DC power transmitter and, in particular, by a signal receiver within the DC power transmitter. Reference is now made to FIG. 4, which shows a block diagram of an example implementation of the DC power transmitter 400 and, in particular, its signal generation components.

The OFDM signal transmitted through the HVDC cable 902 is received by the transmitter 400 through an AC coupling 404 and input to a demodulator 406. The demodulator 406 down-converts the signal to baseband and converts it from analog to digital, both real and imaginary components, in order to reconstruct the time-domain bitstream. If a cyclic prefix was added by the receiver, it may be removed by a cyclic prefix extractor 408. The time-domain bitstream is then transformed to the frequency-domain using a discrete Fourier transform (DFT) 410 or some other spectral transform (e.g. FFT) that is the counterpart to the inverse spectral transform used by the receiver 300 (FIG. 3). The resulting frequency domain signal is the transmitted frequency domain signal as modified by the channel transfer function $h_i$ plus noise $n_i$, as given by:

$$Y_i = h_i X_i + n_i,\quad 1 \le i \le M+L$$

The index i in the above expression is an index to the frequency at which the different data was transmitted in the OFDM-based transmission scheme, since the channel transfer function $h_i$ may vary for different frequencies. The transmitted signal after demodulation at Tx can be modeled as follows:

$$\overline{Y} = DFT_{M+L}\left(IDFT_{M+L}(\overline{X}) * \frac{\overline{H}}{\sqrt{M+L}} + \overline{N}\right)$$

In the above equation, * represents cyclic convolution, $\overline{X}=[X_1, \ldots, X_{M+L}]^T$ is the discrete representation of the input signal in the DFT domain, $\overline{Y}$ is the discrete representation of the received signal at TX in the DFT domain, $\overline{N}$ is the additive noise (which comes auxiliary sources, such as a switching power supply and other environmental signals), and $\overline{H}=\text{diag}[h_1, h_2, \ldots h_{M+L}]$ is the DFT of the channel response. Each value of $h_k$, $1 \le k \le M+L$ can be modeled by following relation:

$$h_k = \frac{1}{\sqrt{M+L}} \sum_i h_i e^{-j\frac{2\pi ki}{M+L}}$$

In the above equation, it can be assumed that the sampling rate is high enough to cover the bandwidth of the transmitted signal and the frequency representation of the impulse response of the cable.

The reconstructed frequency domain signal in the DFT domain may be represented as follows:

$$\overline{Y} = \overline{H}\overline{F}\overline{X} + \overline{N}$$

In the above relation, $\overline{F}$ is the matrix representation of the DFT operator which can be expressed as follows:

$$\overline{W} = \begin{bmatrix} W_{M+L}^{00} & \cdots & W_{M+L}^{0(N-1)} \\ \vdots & \ddots & \vdots \\ W_{M+L}^{(M+L-1)0} & \cdots & W_{M+L}^{(M+L-1)(M+L-1)} \end{bmatrix}$$

In the above expression, the elements of $\overline{W}$ have the following form:

$$W_{M+L}^{lk} = e^{-\frac{j2\pi}{M+L}lk},\ 1 \le l, k \le M+L$$

The matrix representation of the cable impulse response is a diagonal element that is represented by $\overline{H}=\text{diag}(h_1, h_2, \ldots h_{M+L})$ The reconstructed frequency domain bitstream is inverse permuted 412 using a transposed permutation matrix $\overline{P}^T$. The inverse permutation rearranges the symbols so as to group the message symbols and the redundant symbols as they were originally concatenated. That is, it rearranges the received and reconstructed symbols into the message vector concatenated with the redundant symbols vector, as modified by the channel transfer function:

$$\overline{Y} = \overline{H}\left[\overline{D}^T \,\middle|\, \overline{V}^T\right] + \overline{N}$$

The two vectors may then be separated, thereby enabling message symbol extraction 414 where the message vector $\overline{D}^T$ is modified by the transfer function $\overline{H}_1$ applicable to the frequencies on which the message symbols were sent in the OFDM scheme. Likewise, the last L symbols of the vector $\overline{Y}$ can be extracted, as indicated by reference numeral 418, which provide the redundant symbols vector $\overline{V}^T$ as modified by the transfer function $\overline{H}_2$ applicable to the frequencies on which the redundant symbols were sent in the OFDM scheme. The extracted message symbols, $\overline{H}_1[d_1, d_2, \ldots d_M]^T$, may then be decoded in a decoder 416. The extracted redundant symbols, $\overline{H}_2[v_1, v_2, \ldots v_L]^T$, may then be provided to a fault detector 420. In many implementations, the redundant symbols vector $\overline{V}^T$ is a known and predetermined sequence of symbols, thereby enabling the fault detector 420 to determine the transfer function $\overline{H}_2$ applicable to the frequencies on which the redundant symbols were sent in the OFDM scheme and to identify changes in the transfer function $\overline{H}_2$. A change in the transfer function $\overline{H}_2$ of more than a threshold amount may be detected as a fault event and may trigger disconnection of the transmission line cable from the high voltage DC source and, in many cases, fast discharge of the line. Notably, the signal receiver in the transmitter 400 does not need to decode the redundant symbols to track changes in the transfer function $\overline{H}_2$.

Figure 5:
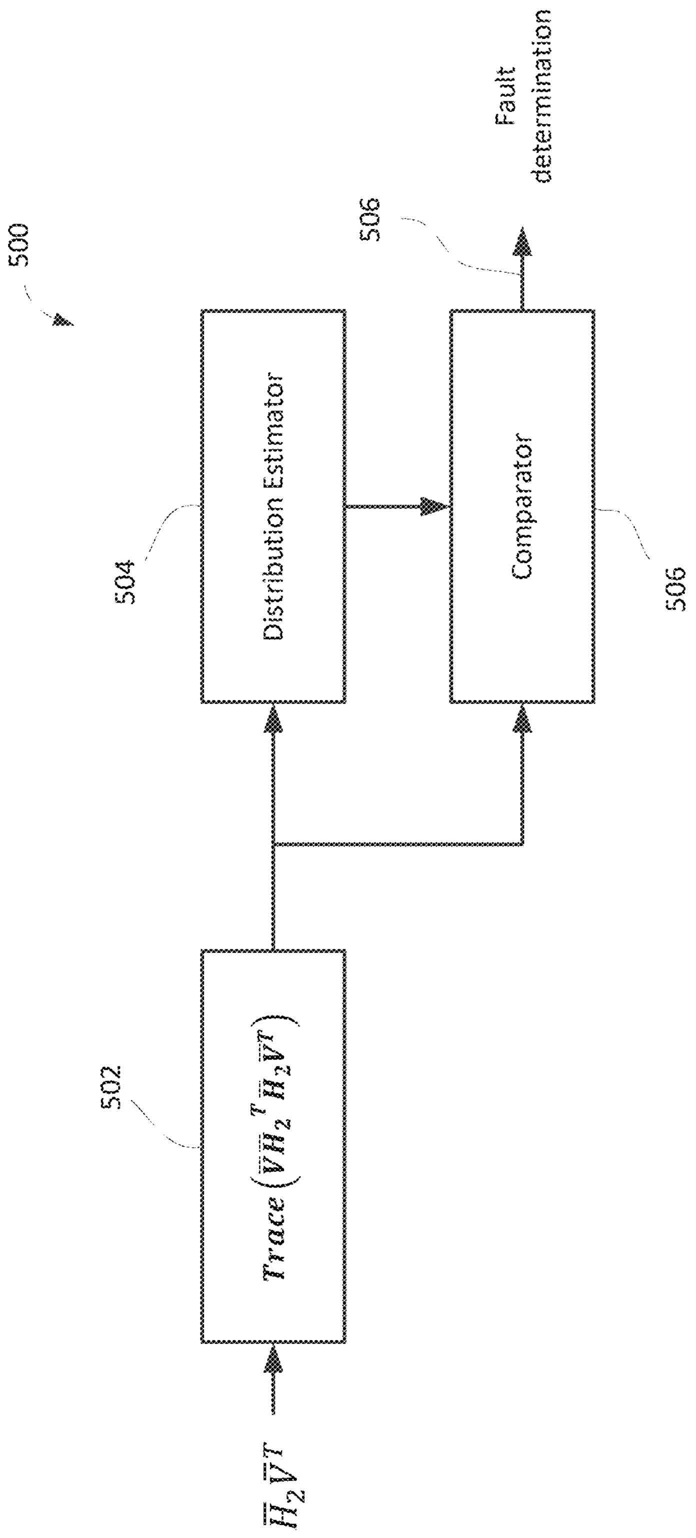
FIG. 5 shows a block diagram of an example of a fault detector.

Reference will now be made to FIG. 5, which shows, in block diagram form, one example embodiment of a fault detector 500 or a fault detection circuit. The fault detector 500 may be implemented within the DC power transmitter as part of the signal receiver for communications and fault detection. As will be described below, the fault detector 500 may be implemented within the DC power receiver as part of a signal transceiver for bi-directional communications and fault detection. The bi-directional communications may be half-duplex in some implementations.

The fault detector 500 receives the extracted redundant symbols vector, $\overline{H}_2\overline{V}^T$, obtained from the received signal. That vector may be multiplied by its transpose and the product can be input to a trace function 502 in order to determine a measured energy of the received signal through that portion of the channel utilized by the redundant symbols, e.g. the subband or subbands. The measured energy is proportional to the transfer function $\overline{H}_2$ for that part of the channel. Monitoring changes in the trace value allows for monitoring for changes in the transfer function $\overline{H}_2$.

Changes may be tracked by, in some examples, finding the difference in the measured energy of the current set of propagated redundant symbols from the energy of the previously received set of propagated redundant symbols. A large change in magnitude of the energy of the received symbols may indicate a fault.

In this example, the fault detector 500 includes a distribution estimator 504 and a comparator 506. The comparator 506 may compare the magnitude of the change in energy of the received signal with a threshold value. A greater-than-threshold change in the energy of the received signal may be indicative of a fault event and may trigger a fault signal.

In some embodiments, the threshold value may be adjusted based on noise characteristics of the channel. The distribution estimator may monitor the characteristics of the channel, such as the received energy of the redundant symbols over successive transmissions and may determine a distribution of energy magnitudes. In some cases, this may include determining a function describing the distribution. The function may describe the probability distribution of energy magnitudes of the received redundant symbols vector. The threshold value may then be set based on the probability distribution. That is, it may be determined as a function of the probability distribution so as to exclude expected noise and to ensure the threshold is set at a level that captures faults but that avoids false positive alarms. In this manner, the threshold value may be adaptive and may shift over time as the characteristics of the channel or the noise environment evolve.

In an example embodiment, as described above, the extracted redundant symbols vector for a time or instance $$j, \bar{H}_2 \bar{V}_j^T,$$

is obtained from the received signal. The energy of the received redundant symbols vector may be determined using a trace function, such as:

$$Tr(\bar{V}_j \bar{H}_2^T \bar{H}_2 \bar{V}_j^T)$$

The energy of the current set of received redundant symbols may be compared to the energy of at least the preceding set of received redundant symbols from time instances j−1, giving an energy magnitude difference $q_j$ expressed as:

$$q_j = |Tr(\bar{V}_j \bar{H}_2^T \bar{H}_2 \bar{V}_j^T) - Tr(\bar{V}_{j-1}^T \bar{H}_2^T \bar{H}_2 \bar{V}_{j-1}^T)|$$

The energy magnitude difference is then compared to a threshold value T and if larger than T, then a fault signal is output. If not larger than T, then no fault is detected and the system continues to monitor for time instances j+1 and so on.

In one example implementation, to dynamically set or adjust the threshold value, the system may build a vector of energy magnitude difference measurements $\bar{q}=[q_1, q_2, \ldots q_n]$ where the vector includes the $q_{j-1}$ value determined for j−1 and n−1 preceding q value measurements. The range of q measurements from 0 to $q_{max}$ may be divided or partitioned into k separate bins, where the $i^{th}$ bin is associated with q values between $$\frac{(i-1)q_{max}}{k} \text{ and } \frac{i\ q_{max}}{k}.$$

The system may then count the number of elements of $\bar{q}$ in each bin. The count may be expressed as $n_i$ where $\Sigma_i n_i = n$.

The system may then determine a probability distribution based on the counts for each bin. In one example, the probability distribution may be expressed as a function, $f_Q(q)$, where the function may be estimated from:

$$n \int_{\frac{(i-1)q_{max}}{k}}^{\frac{i\ q_{max}}{k}} f_Q(q)\, dq \approx n \frac{q_{max}}{k} f_Q\left(\frac{(2i-1)q_{max}}{2k}\right) = n_i$$

With a probability distribution determined based on a history of energy magnitude difference measurements for the set of redundant symbols and this particular transmission line and noise environment, the system may then set a threshold value T based on the distribution so as to exclude likely noise and ensure only energy magnitude changes significant enough to be a likely fault condition will result in a fault signal.

In one example, the value of T may be set by selecting a fault probability parameter & that is sufficiently small and then finding the threshold value T that corresponds to that probability parameter. In one example, this may be expressed as:

$$\int_T^{\infty} f_Q(q) dq < \epsilon$$

In the above expression, the minimum threshold value T is found that ensures the resultant portion of the probability distribution remains below the alarm probability parameter In this manner, as the distribution changes as a result of, for example, changes in the noise environment, the threshold value T also changes.

It will be appreciated that other mechanisms and mathematical expressions may be used in other implementations so as to achieve similar results in adaptively adjusting the threshold value T so as to track a fault probability that is based on a recent window of energy magnitude change measurements.

Figure 6:
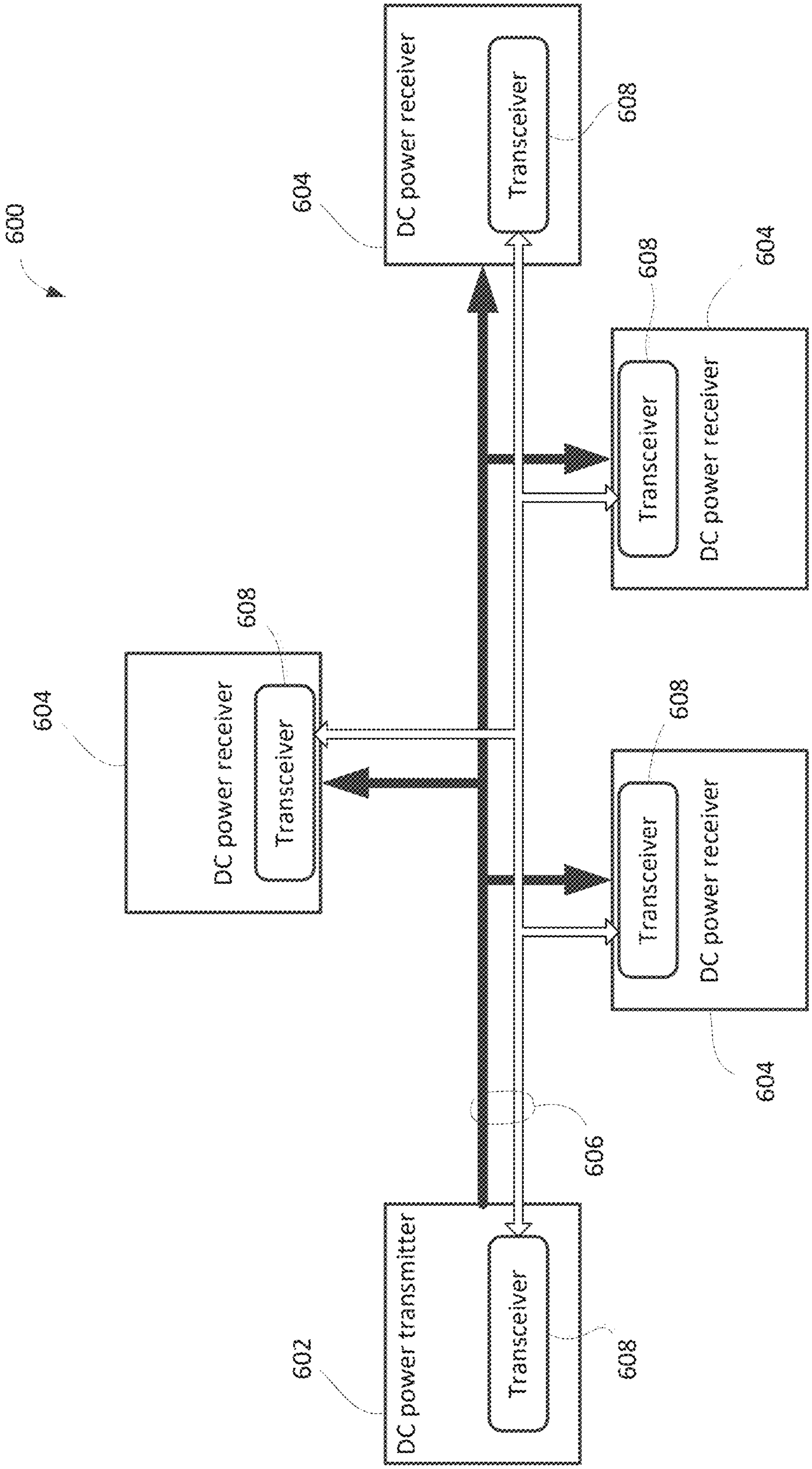
FIG. 6 shows a simplified example system for DC power distribution to multiple receivers employing bi-directional communications and fault detection.

Reference is now made to FIG. 6, which shows an example embodiment of a DC power distribution system 600 having bi-directional communications and fault detection capability. It will be noted that the system 600 includes a DC power transmitter 602 and a plurality of DC power receivers 604. The DC power transmitter 602 is connected to a power source and energizes a transmission line 606 with high voltage DC power. Each of the DC power receivers 604 is coupled to the transmission line 606 in order to couple one or more loads to the transmission line 606. DC power. Accordingly, DC power is supplied by the DC power transmitter 602 to the one or more DC power receivers 604 as indicated by the black arrows in the dark lines.

Each of the DC power transmitter 602 and the DC power receivers 604 include transceivers 608 configured to transmit an OFDM signal over the transmission line 606 and to receive transmitted OFDM signals from other transceivers 608 over the transmission line 606, as indicated by the bi-direction white arrows. The OFDM signals include modulated message symbols and redundant symbols, as described above. The transceivers 608 include fault detectors to detect a greater-than-threshold change in the transfer function of the transmission line 606 and, in response, to trigger disconnection of that respective transmitter 602 and/or receiver 604 from the transmission line 606.

In many implementations, with multiple transceivers all using the same frequency bands for communication a process may be used to avoid collisions. In one example, before transmitting a signal, a data transceiver must first receive a signal from the HVDC cable, then after demodulation and DFT operations the receiver extracts $[\bar{D}_1 \bar{D}_2 \ldots \bar{D}_j]$ which represents a matrix consisting of part of the received signal. Then it calculates the inner product of the vector $\bar{D}$ as follows:

$$\frac{1}{j} \sum_{0 \le l \le j} \bar{D}_l \cdot \bar{D}_l = \frac{1}{j} \sum_{0 \le l \le j} \sum_i d_i^2(l)$$

If the value of $\bar{D} \cdot \bar{D}$ is greater than a specific threshold value, it shows that another transceiver may be sending data.

If another active transceiver was detected, the transceiver waits for j=j−1 time snapshots to detect received signal power and compare it with a threshold value, if this value is below the threshold value it will send data.

It will be appreciated that it may be that some or all of the above-described operations of the various above-described example methods may be performed in orders other than those illustrated and/or may be performed concurrently without varying the overall operation of those methods. It will also be appreciated that some or all of the above-described operations of the various above-described example methods may be performed in response to other above-described operations.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A fault detection system for detecting a fault condition, the system comprising:

- a power transmitter to energize a transmission line with high voltage DC power; and
- a power receiver to couple the transmission line to a load, wherein the power receiver includes a signal generator coupled to the transmission line to generate and propagate a high frequency signal on the transmission line using multiple subbands and orthogonal frequency division multiplexing to encode a bitstream that includes a set of message symbols and a set of redundant symbols, and wherein the set of redundant symbols are transmitted on one or more of the multiple subbands, and
- wherein the power transmitter includes,
  - a signal receiver coupled to the transmission line to receive the high frequency signal, to extract a set of propagated redundant symbols, and to measure, using the set of propagated redundant symbols, a parameter proportional to a channel frequency response of the transmission line,
  - a fault detection circuit to output a fault signal based on a change in the parameter that exceeds a threshold value, wherein the parameter comprises a measured energy of the set of propagated redundant symbols, and
  - a switch operable in response to the fault signal to disconnect the transmission line from the high voltage DC power.

2. The fault detection system of claim 1, wherein the signal generator is configured to mix the set of message symbols with the set of redundant symbols in accordance with a permutation matrix.

3. The fault detection system of claim 2, wherein the signal receiver is configured to extract the set of propagated redundant symbols using an inverse permutation matrix that is the inverse of the permutation matrix.

4. The fault detection system of claim 1, wherein the set of propagated redundant symbols comprises the set of redundant symbols modified by the channel frequency response, and wherein the energy is determined based on a trace function applied to a matrix-based expression of the set of propagated redundant symbols.

5. The fault detection system of claim 1, wherein the fault detection circuit is configured to determine the change in the parameter by determining a magnitude of a difference between the measured energy of the set of propagated redundant symbols and a measured energy of a previously-propagated set of redundant symbols and comparing the magnitude of the difference to the threshold value.

6. The fault detection system of claim 5, wherein the fault detection circuit is further configured to adaptively adjust the threshold value based on a history of measured energy tracking changes in the channel frequency response over a time period.

7. The fault detection system of claim 6, wherein the fault detection circuit is configured to adaptively adjust the threshold value by determining a probability distribution of energy magnitude changes over the time period and setting the threshold value as a function of the probability distribution so as to exclude a substantial portion of the probability distribution attributable to environmental noise.

8. The fault detection system of claim 1, wherein the set of redundant symbols comprises a sequence of predetermined symbols.

9. The fault detection system of claim 1, further comprising a termination impedance at the power transmitter, wherein the termination impedance is selected to match a characteristic impedance of the transmission line.

10. The fault detection system of claim 1, further comprising a discharge circuit configured to receive the fault signal and to couple the transmission line to ground in response to the fault signal.

11. A fault detection system for detecting a fault condition in a direct current (DC) system, the system comprising:

- a power transmitter to energize a transmission line with high voltage DC power;
- a power receiver to couple the transmission line to a load;
- at the power receiver, a signal generation means, including,
  - means to generate and propagate a high frequency signal on the transmission line using multiple subbands and orthogonal frequency division multiplexing to encode a bitstream that includes a set of message symbols and a set of redundant symbols, and wherein the set of redundant symbols are transmitted on one or more of the multiple subbands; and
- at the power transmitter,
  - means to receive the high frequency signal, to extract a set of propagated redundant symbols, and to measure, using the set of propagated redundant symbols, a parameter proportional to a channel frequency response of the transmission line,
  - means to output a fault signal based on a change in the parameter that exceeds a threshold value, and
  - means to, in response to the fault signal, disconnect the transmission line from the high voltage DC power.

12. A method of detecting a fault condition on a transmission line, the method comprising:

- energizing a transmission line with high voltage DC power from a power transmitter, wherein the transmission line is coupled to a load at a power receiver;
- generating and propagating a high frequency signal on the transmission line using multiple subbands and orthogonal frequency division multiplexing to encode a bitstream that includes a set of message symbols and a set of redundant symbols, and wherein the set of redundant symbols are transmitted on one or more of the multiple subbands;

receiving, at the power transmitter, the high frequency signal and extracting a set of propagated redundant symbols;

measuring, using the set of propagated redundant symbols, a parameter proportional to a channel frequency response of the transmission line, wherein the parameter comprises a measured energy of the set of propagated redundant symbols;

outputting a fault signal based on a change in the parameter that exceeds a threshold value; and disconnecting the transmission line from the high voltage DC power in response to the fault signal.

13. The method of claim 12, wherein the generating and propagating includes mixing the set of message symbols with the set of redundant symbols in accordance with a permutation matrix.

14. The method of claim 13, wherein extracting the set of propagated redundant symbols includes using an inverse permutation matrix that is the inverse of the permutation matrix.

15. The method of claim 12, wherein determining the measured energy includes using a trace function applied to a matrix-based expression of the set of propagated redundant symbols.

16. The method of claim 12, wherein outputting the fault signal includes determining the change in the parameter by determining a magnitude of a difference between the measured energy of the set of propagated redundant symbols and a measured energy of a previously-propagated set of redundant symbols and comparing the magnitude of the difference to the threshold value.

17. The method of claim 16, further including adaptively adjusting the threshold value based on a history of measured energy tracking changes in the channel frequency response over a time period.

18. The method of claim 17, wherein adaptively adjusting the threshold value includes determining a probability distribution of energy magnitude changes over the time period and setting the threshold value as a function of the probability distribution so as to exclude a substantial portion of the probability distribution attributable to environmental noise.

* * * * *